United States Patent [19]

Takahashi et al.

[11] Patent Number: 4,463,799

[45] Date of Patent: Aug. 7, 1984

[54] HEAT STORAGE MEDIUM FOR LATENT HEAT THERMAL ENERGY STORAGE UNIT

[75] Inventors: Yoshio Takahashi, Urawa; Takeo Ozawa, Ibaraki; Ryuji Sakamoto, Kashiwa; Katsuhiko Kanari; Masayuki Kamimoto, both of Ibaraki, all of Japan

[73] Assignee: Agency of Industrial Science Technology, Ministry of International Trade & Industry, Tokyo, Japan

[21] Appl. No.: 315,865

[22] Filed: Oct. 28, 1981

[30] Foreign Application Priority Data

Oct. 29, 1980 [JP] Japan .................. 55-151845

[51] Int. Cl.³ .............................................. F28D 21/00
[52] U.S. Cl. ................................... 165/10; 264/22; 264/83; 252/70
[58] Field of Search ................... 165/10; 264/22, 83; 252/70

[56] References Cited

U.S. PATENT DOCUMENTS 4,063,546 12/1977 Schmid et al. .............. 165/10 X
4,182,398  1/1980 Salyer et al. .................. 165/1
4,259,198  3/1981 Kreibich et al. ............ 165/10 X Primary Examiner—Albert W. Davis, Jr.
Attorney, Agent, or Firm—Oblon, Fisher, Spivak, McClelland & Maier

[57] ABSTRACT

A heat storage medium for use in a latent heat TES unit is obtained by treating a crystalline polyolefin with ion plasma thereby crosslinking it only in the surface region.

3 Claims, 4 Drawing Figures

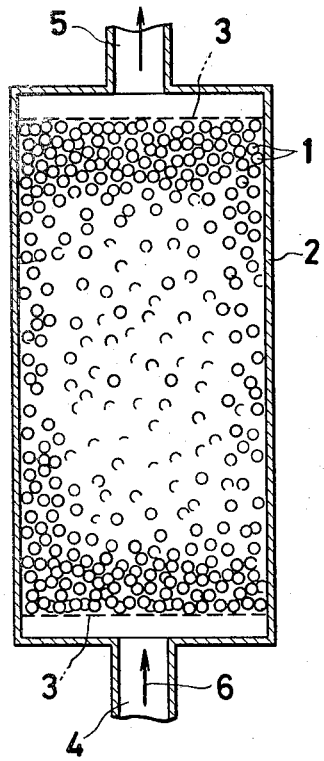
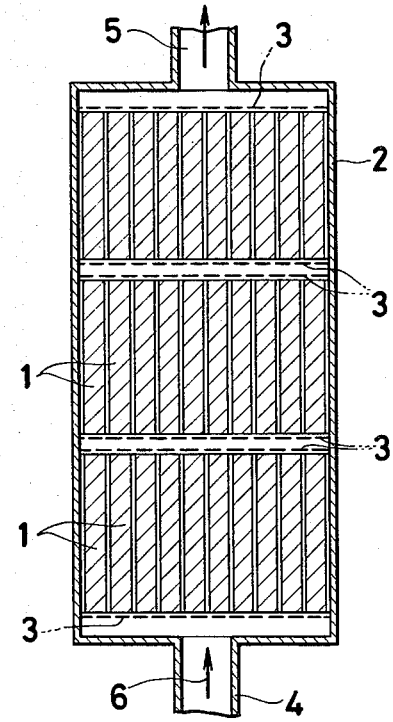
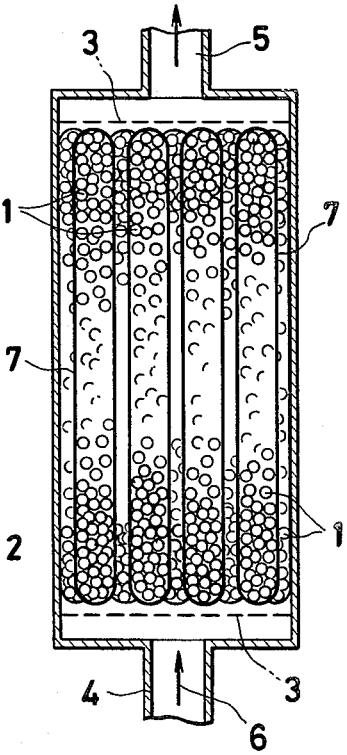
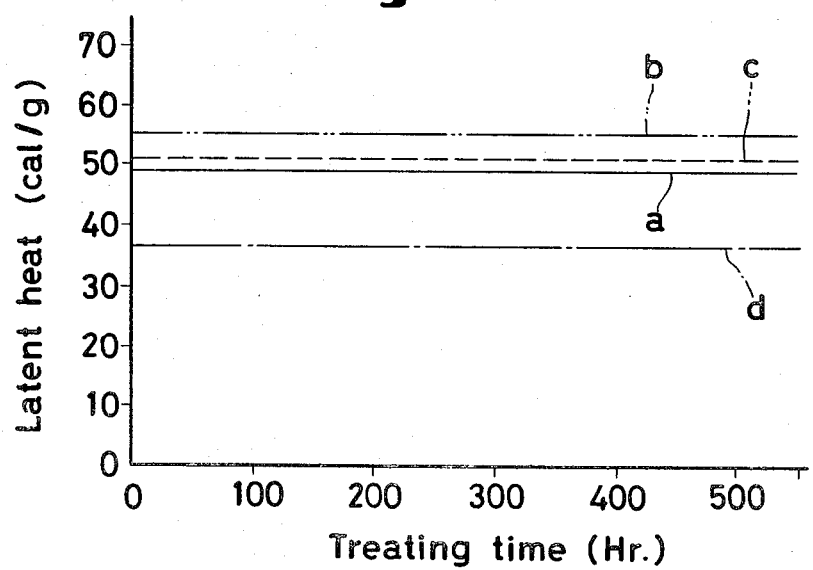

HEAT STORAGE MEDIUM FOR LATENT HEAT THERMAL ENERGY STORAGE UNIT

BACKGROUND OF THE INVENTION

This invention relates to a heat storage medium for use in a latent heat thermal energy storage unit.

The qualities which thermal energy storage units in general are required to posssess are large capacities for storage of heat, low price, long service life, and good heat transfer characteristics. Broadly thermal energy storage units (hereinafter referred to as "TES units") are divided into sensible heat TES units which make use of advantageous heat capacities and latent heat TES units which make use of latent heat as in fusion and solidification of substances or transition of crystals. In the former heat TES units, the capacities are determined by the temperature and heat capacity of the heat storage media used therein. To increase capacities, therefore, the TES units are required to either heighten the temperature of heat storage media or increase the volume of heat storage media to be used. In the latter heat TES units which make use of the heat of fusion of crystalline substances, since the heat storage media on fusion assume a liquid state, they require perfect separation between heat transfer media and heat storage media used therein and inevitably complicate their structures. If a heat storage medium to be used in a latent heat TES unit is processed so that it retains its original form even when it is softened during the fusion, then this heat storage medium can be kept in direct contact with the heat transfer medium. The use of this heat storage medium, therefore, siimplifies the TES unit's structure and enhances the heat transfer characteristics.

Crystalline polyolefins are inexpensive, possess high thermal stability, produce no corrosive actions upon containers and other vessels, exhibit no toxicity, and generate relatively large latent heat. These are excellent qualities for a heat storage medium in a latent heat TES unit. Nevertheless, they have a disadvantage that, even in a fused state, they are so viscous as to defy flowing motion by convection or agitation unlike ordinary liquids and further that, because of their low thermal conductivity, they cannot be effectively used in the form of large blocks. To overcome these disadvantages, there have been proposed a method which uses such crystalline polyolefins as molded in the form of pellets, rods or films and crosslinked so that they will retain their original forms even when they are exposed to contact with a heat transfer medium, and a method which uses the polyolefins as enclosed with capsules.

As for the aforementioned methods, there are methods disclosed in U.S. Pat. No. 4,182,398 which are indicated below:

(i) Crosslinking effected with a crosslinking agent such as a peroxide incorporated in polyolefins.
(ii) Crosslinking effected by irradiation with electron beams.
(iii) Using graft-polymerization to cover the surface of polyolefins with a silane which acts as a capsule.

The polyolefins, when crosslinked with a crosslinking agent incorporated therein, suffer degradation of the particular qualities which make them suitable for storage of latent heat. When the crosslinking of polyolefins is effected by irradiating polyolefins with electron beams, the polyolefins are crosslinked to the interior and are apt to suffer degradation of the qualities which make them suitable for storage of latent heat. The method which effects form-stability by grafting the surface of polyolefins with a silane is not economical because it requires large equipment and complicates the production process.

SUMMARY OF THE INVENTION

An object of this invention is to provide a heat storage medium for a latent heat TES unit, which is made of a crystalline polyolefin so treated that it retains the particular qualities which make it suitable for storage of latent heat undegraded and also retains its original form unaffected by fusion or flow even when it is held in direct contact with a heat transfer medium.

To accomplish the object described above according to the present invention, there is provided a heat storage medium which is obtained by forming crystalline polyethylene in a required shape such as pellets, rods, or films and treating the formed polyethylene with ion plasma. When the formed crystalline polyolefin is treated with the ion plasma as described above, crosslinking occurs only in the surface region of the formed crystalline polyolefin. Consequently, the heat storage medium is allowed to retain its form unaffected by external impacts such as of fusion or flow even when it is held in direct contact with a heat transfer medium. In addition, it retains intact the desirable heat conduction properties attributable to its particular pellet, rod or film shape.

The other objects and characteristics of this invention will become apparent from the further disclosure of the invention to be made below with reference to the accompanying drawings.

BRIEF DESCRIPTION OF THE DRAWING

FIG. 1 is a longitudinal cross section illustrating the first embodiment of the latent heat TES unit packed with the heat storage medium of the present invention.

FIG. 2 is a longitudinal cross section illustrating the second embodiment of the latent heat TES unit packed with the heat storage medium of the present invention.

FIG. 3 is a longitudinal cross section illustrating the third embodiment of the latent heat TES unit packed with the heat storage medium of the present invention.

FIG. 4 is a graph showing the relation between the heating time and the latent heat obtained of the heat storage medium of the present invention.

DESCRIPTION OF PREFERRED EMBODIMENTS

As materials for the heat storage medium in the latent heat TES unit, polyolefins possess excellent qualities such as low price, high safety, and relatively large latent heat. When a heat storage medium made of a polyolefin in particulate form is fused, the individual particles of the medium mutually adhere and induce degradation of heat transfer characteristics due to low heat transfer area. There have been proposed methods for precluding the mutual adhesion of the individual particles of the heat storage medium during its fusion by grafting with a silane or by crosslinking the crystalline polyolefin or a thermoplastic resin, or by irradiation with electron beams, for example. These efforts, however, tend to impair the desirable qualities of polyolefins as materials for the heat storage medium in the latent heat TES unit.

The inventors made various studies and experiments in search for a crystalline polyolefin capable of retaining its advantageous qualities for the storage of latent heat intact and defying flow and mutual adhesion during fusion. They have consequently found that when a crystalline polyolefin formed in a required shape such as pellets, films or rods is treated with ion plasma, the polyolefin in the particulate form is crosslinked only in the surface region thereof so that the heat storage medium, on contact with the heat transfer medium, is fused only inside the individual polyolefin pieces and, therefore, is prevented from mutual adhesion and allowed to retain the original advantageous qualities of the polyolefin virtually intact. This invention has been accomplished on this knowledge.

Theoretically, any polyolefin can be used for the purpose of this invention so far as it is crystalline. From the practical point of view, however, crystalline polyethylene proves advantageous over all the other polyolefins. The crystalline polyolefin is formed by a known method in any desired shape such as pellets, rods, or films to suit the particular structure of the latent heat TES unit to be used. When crystalline polyethylene is adopted, the heat storage medium is desirably molded in the shape of pellets of a diameter roughly in the range of 0.5 to 3 mm, rods of a diameter roughly in the range of 2 to 10 mm, or films of a thickness roughly in the range of 0.3 to 1.0 mm.

After the crystalline polyolefin has been formed in the required shape as described above, it is treated with ion plasma. The plasma reactor to be used for this treatment can be of any of the known types using any of various power sources such as high frequency waves, micro-waves, direct current, alternating current, etc.

The treating time is suitably fixed, depending on the structure of the reactor, the type of power source, the inner pressure of the reactor, the flow volume of gas, the shape of the crystalline polyolefin particles, etc. If the treating time is more or less greater than is actually required, since the collision cross-section of molecular ions or atomic ions colliding with the polyolefin particles is large enough, the crosslinking reaction is allowed to occur only within the surface region of the polyolefin particles. Thus, the polyolefin retains its crystallinity (latent heat) substantially intact. Volume treatment of the polyolefin with ion plasma can be obtained by causing the polyolefin already formed in the required shape to be retained for a required length of time in the current of ion plasma. In this manner, the treatment can be carried out continuously.

When the crystalline polyolefin particles which have been subjected to the ion plasma treatment as described above are exposed to a heat transfer medium at an elevated temperature of about 150° C., they melt by absorbing the latent heat and become fluid in their inner region but are not rendered fluid on their surface to the extent of inducing mutual adhesion of adjacent polyolefin particles. As the temperature falls, the polyolefin particles resume their original shape.

The crystalline polyolefin particles which have been treated with ion plasma as described above are placed in the latent heat TES unit and left in contact with the heat transfer medium.

FIG. 1 illustrates one embodiment of the latent heat TES unit usable with the heat storage medium of this invention. It comprises a thermal energy storage tank 2, an inlet 4 and an outlet 5 both provided in the thermal energy storage tank and adapted for permitting flow of a heat transfer medium through the interior of the thermal energy storage tank, and metal nets 3 provided one each in the upper and lower parts of the interior of the thermal energy storage tank. The interior space defined by the wall of the tank and the two metal nets is packed with a heat storage medium 1 prepared by treating a pelletized polyolefin with ion plasma. In the latent heat TES unit constructed as described above, storage of heat is effected by passing a heat transfer medium 6 at an elevated temperature through the inlet 4 into direct contact with the heat storage medium 1 thereby melting the interior of the particles of the heat storage medium 1. The heat transfer medium 6 which has completed heat exchange and has consequently been cooled to a lower temperature is discharged through the outlet 5. When the packing density of the heat storage medium in the tank is lowered, the medium is fluidized by the flow of the heat transfer medium and, in the fluidized state, is allowed to exchange heat with the heat transfer medium.

Since the polyolefin is oxidized and consequently embrittled in the presence of oxygen, the heat transfer medium must be free from oxygen. Thus, an inert gas such as argon or nitrogen gas can be used advantageously as the heat transfer medium. Optionally, a liquid heat transfer medium may be used on condition that it is prevented from exposure to air.

FIG. 2 illustrates a latent heat TES unit which is packed with a multiplicity of rods of the heat storage medium of this invention. When the heat storage medium 1 which is in the shape of rods exchanges heat with the heat transfer medium 6, it is wholly softened as its interior is fused. If the heat storage medium is in the shape of rods of a large length, the rods wholly softened as described above are no longer able to retain their straight shape but are bent out of shape. Consequently, the heat transfer medium finds its way through particular paths formed between bent rods within the thermal energy storage tank interior and tends to depart from the outlet 5 before it has amply exchanged heat with the heat storage medium. To preclude this trouble, therefore, a multiplicity of metal nets 3 are spaced in the direction of the flow of the heat transfer medium inside the thermal energy storage tank 2 so as to ensure effective contact beteen the heat transfer medium and the heat storage medium.

FIG. 3 illustrates another manner in which the heat storage medium of the present invention is put to use. The latent heat TES unit in this embodiment is formed by preparing a multiplicity of capsules 7 each made of a metal such as iron, aluminum, or stainless steel and packed airtightly with the heat storage medium 1 of a suitable shape in conjunction with a liquid heat transfer medium of low vapor pressure such as, for example, silicone oil or ethylene glycol, and encasing these capsules within a thermal energy storage tank 2. In this embodiment, any gaseous or liquid substance which is incapable of corroding the TES unit can be used as the heat transfer medium 6 serving to effect heat exchange even if it is capable of affecting the inherent properties of the heat storage medium. In this respect, the present embodiment proves economical. When iron, stainless steel or other similar metal is adopted as the material for the capsules, the capsules can be safely exposed without any cnange in appearance to the heat transfer medium even at such a high temperature that the interior of the heat storage medium contained therein is fused.

Release of the stored latent heat from the TES unit is accomplished by introducing a medium desired to be heated through the inlet 4 into the thermal energy storage tank 2 in the same way as in the storage of heat thereby allowing the medium to absorb the heat of fusion (latent heat) from the heat storage medium 1 and thereafter discharging the medium through the outlet 5.

Among many constructions of the latent heat TES unit in which the heat storage medium of the present invention can be effectively used, three typical constructions have been cited above by way of illustration. When the heat storage medium is in the shape of films, for example, the latent heat TES unit is required to be in a construction which befits the particular shape of the heat storage medium.

As described in detail above, the present invention prepares the heat storage medium by treating separate pieces of a crystalline polyolefin with ion plasma thereby crosslinking the crystalline polyolefin in the surface region of the separate pieces thereof. Consequently, when this heat storage medium is exposed to the heat transfer medium at an elevated temperature, it is softened but is left unfused with the exception of the interior thereof by the action of the heat. When it is formed in the shape of pellets, rods, or films, the separate pieces thereof do not adhere to one another. When the separate pieces of the heat storage medium are surrounded by the heat transfer medium, they are prevented from contact with the ambient air and consequently from the otherwise possible oxidative degradation and are enabled to offer stable service for a long time.

Now, the present invention will be described with reference to examples. It should be noted, however, that this invention is not limited to these examples.

EXAMPLE 1

In a plasma C.V.D. (chemical vapor deposition) apparatus having a quartz reaction tube 150 mm in diameter 225 mm in height provided 100 mm thereabove with two semicircular electrodes, 5 g of crystalline polyethylene pellets about 1 mm in diameter were placed in a specimen receptacle. The container of the apparatus was evacuated to $10^{-3}$ Torr and, thereafter, argon gas was fed to the container at a rate of 300 ml/min until the inner pressure of the container rose to about 0.25 Torr. Then, an electric current of 0.24 A and 1.5 kV was applied to the anode to cause generation of argon ions, with the pellets exposed to the argon ions for a varying contact time (20, 30, and 40 minutes). At the end of the treatment, the specimen was tested for latent heat and melting point. The results were as shown in the following Table. For the purpose of comparison, the latent heat and melting point obtained of the same polyethylene pellets in their untreated form are also shown in the Table. The term "melting point" as used herein means the temperature at which a given polyethylene sample was fused to a substantially liquid state retaining virtually no crystalline phase.

TABLE

| Specimen No. | Treating time (min) | Latent heat (Cal/g) | Melting point (°C.) |
| --- | --- | --- | --- |
| 1 | 20 | 47.2 | 136.1 |
| 2 | 30 | 46.7 | 136.7 |
| 3 | 40 | 46.8 | 135.8 |
| Comparative specimen | — | 43.3 | 135.2 |

The polyethylene pellets of Specimen Nos. 1, 2, and 3 which had been treated with ion plasma and the polyethylene pellets of Comparative specimen which had not been treated were brought into contact with silicon oil heated to 150° C. While those of Specimen Nos. 1, 2 and 3 were found to show no change and resume their original form after removal of heat. The polyethylene pellets of Comparative specimen fused to one another in the hot silicone oil and remained in the fused state even after removal of heat.

Then, the polyethylene pellets of Specimen No. 2 were placed in an aluminum container with silicon oil (made by Shinetsu Chemical Co., Japan and marketed under designation of KF-54) sealed therein, set in position within a constant temperature bath, and tested for possible loss of latent heat and possible degradation of material. For the purpose of comparison, an aluminum container having untreated polyethylene pellets and silicon oil sealed therein, an aluminum container having untreated polyethylene pellets and alkyl diphenyl (made by Yawata Chemical Co., Japan and marketed under designation of Therm S 600) sealed therein, and an aluminum container having sealed therein polyethylene pellets treated with electron beams were placed at the same time in the constant temperature bath. These specimens were left standing in the bath for 550 hours. At the end of the standing, the specimens were taken out of the bath and tested for latent heat. The results were as shown in FIG. 4. In the graph of FIG. 4, the characteristic curve "a" represents the results of the polyethylene pellets produced by the method of this invention, the characteristic curve "b" those of the specimen including both polyethylene pellets and silicone oil, the characteristic curve "c" those of the specimen including both polyethylene pellets and alkyl diphenyl, and the characteristic curve "d" those of the polyethylene pellets treated by irradiation with electron beam.

It is seen from FIG. 4 that no thermal degradation was obtained in any of the specimens involved. The latent heat of the polyethylene pellets of the present invention was far higher than that of the polyethylene pellets treated with electron beam or that of the untreated polyethylene pellets (43.3 cal/g) and was nearly equal to that of the specimen containing both polyethylene pellets and alkyl diphenyl.

EXAMPLE 2

Polyethylene pellets were treated under the same conditions as those of Example 1, except that the voltage and current at the anode were changed to 2.5 kV and 0.38 A. Consequently, there were obtained polyethylene pellets which possessed practically the same properties as those of Specimen No. 3 of Example 1. When polyethylene pellets were treated by following the procedure described above, except that the current at the anode was changed to 0.37 A and the treating time to 10 minutes, the resultant polyethylene pellets on contact with silicone oil at 150° C. were found to curl slightly. Despite the curling, these pellets could be used effectively as a latent heat storage medium without any trouble.

EXAMPLE 3

In the same apparatus as used in Example 1, a polyethylene film 0.5 mm in thickness and 20 mm × 20 mm in area was placed in a container. The container was evacuated to $10^{-3}$ Torr. Then, argon gas was fed at a flow rate of 200 ml/min into the container and an electric current of 1.5 kV and 0.27 A was fed to the anode to cause generation of argon ions, with the polyethylene film exposed to the ion plasma for 30 minutes. Thereafter, the polyethylene film was turned upside down and was exposed similarly to the ion plasma for 30 minutes. The resultant film was found to have latent heat of 49.3 cal/g (206.5 J/g) and a melting point of 135.2° C. The same polyethylene film as used above was treated under the same conditions described above, except that the flow rate of argon gas was changed to 300 ml/min and the current at the anode was changed to 0.31 A. The resultant polyethylene film was found to have latent heat of 48.2 cal/g (201.1 J/g) and a melting point of 135° C. When the films were exposed to silicone oil at 150° C., absolutely no adhesion was observed between the films. When untreated polyethylene film was placed in contact with silicon oil at 150° C., it was found to shrink and undergo adhesion.

What is claimed is:

1. A heat storage medium for a latent heat TES unit, obtained by treating a crystalline polyolefin with ion plasma thereby crosslinking it only in the surface region thereof.

2. The heat storage medium according to claim 1, wherein the crystalline polyolefin is crystalline polyethylene.

3. The heat storage medium according to claim 1 or claim 2, wherein the crystalline polyolefin is formed in a required shape and thereafter treated with ion plasma.

* * * * *